June 18, 1935.  C. P. RANDOLPH  2,005,635
ELECTRIC TOASTER
Filed Aug. 17, 1931
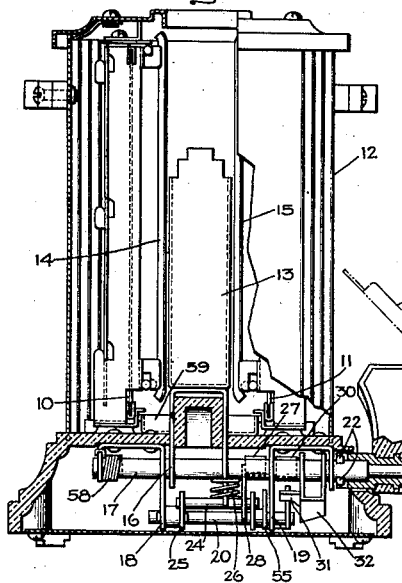
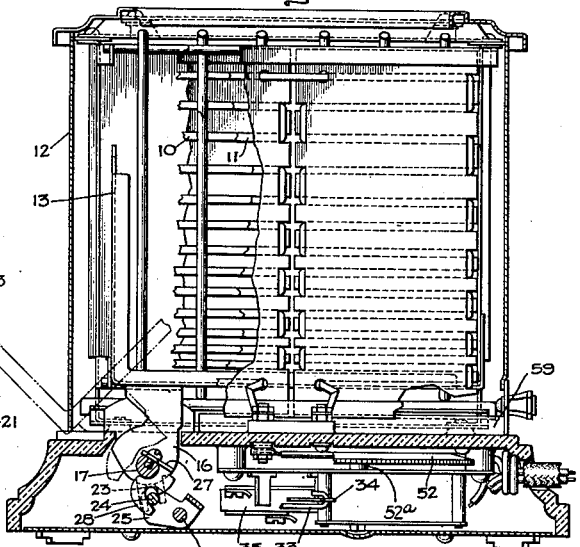
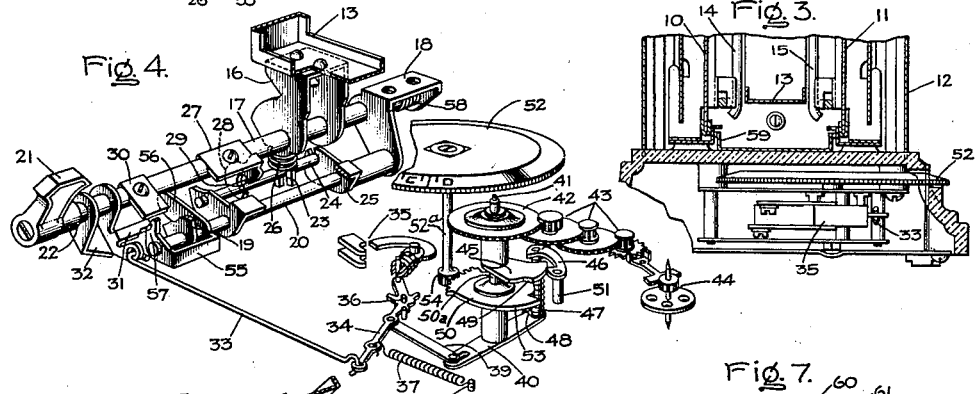
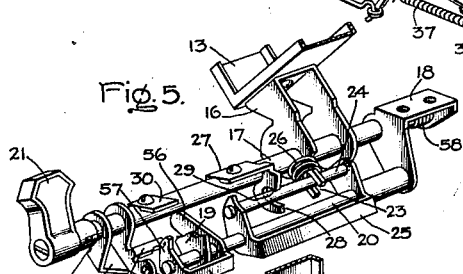
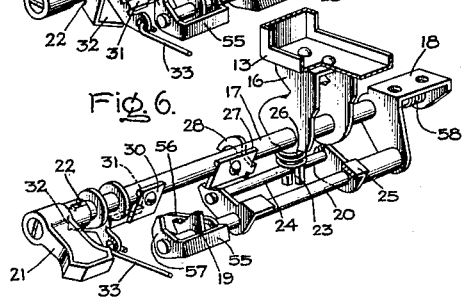
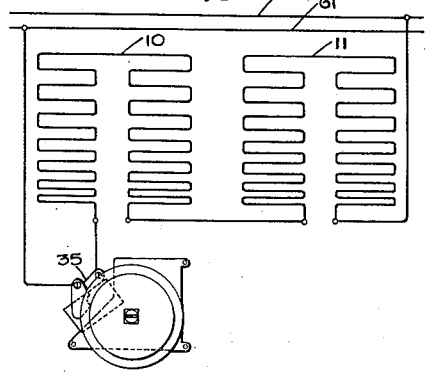
Inventor:
Charles P. Randolph,
by *Charles E. Tullar*
His Attorney.

Patented June 18, 1935

2,005,635

UNITED STATES PATENT OFFICE 2,005,635

ELECTRIC TOASTER

Charles P. Randolph, Oak Park, Ill., assignor to Edison General Electric Appliance Company, Chicago, Ill., a corporation of New York Application August 17, 1931, Serial No. 557,509

15 Claims. (Cl. 219—19)

My invention relates to toasters, and more particularly to electric toasters of the type wherein both sides of a slice of bread are simultneously toasted and the period of heating is automatically controlled and has for an object the provision of a simple, reliable and efficient device of this character.

More specifically, a further object of my invention is to simplify the operation of time controlled electric toasters by the provision of a single operating handle rotatable in a single direction to insert a slice of bread to be toasted in the toaster, to energize the heating elements, and to initiate the operation of timing mechanism, at the same time providing for the removal of the slice for inspection at any time.

In carrying out my invention in one form, I provide a slice holder pivotally mounted between the heating elements in such manner as to be movable out of the toasting position between the heating elements to permit the insertion, the inspection or the removal of the slice. A single rotatable actuating means or handle is operatively connected to the slice holder, the timing mechanism and to the heat controlling switch. The arrangement is such that a slice of bread to be toasted may be placed in the toast holder and by rotating the handle the slice is moved to the toasting position, the heat controlling switch is closed and the timing mechanism is started.

After the timing mechanism has been initiated for a toasting period, a stop becomes effective to prevent further interference therewith by the actuating handle. However, the handle may at any time be rotated in the opposite direction to move the slice holder from the toasting position for the inspection or removal of the toast. As the slice holder is operated solely by the actuating handle, the toast remains in the toaster after the opening of the heat control switch by the timing mechanism and is thereby kept warm and palatable.

For a more complete understanding of my invention, reference should now be had to the accompanying drawing, in which Fig. 1 is can end view of an electric toaster embodying my invention; Fig. 2 is a side view of Fig. 1 with one side partially cut away to show the position of the heating element; Fig. 3 is a sectional view of a portion of one end of the toaster showing the location and arrangement of the timing mechanism; Fig. 4 is a perspective view of the operating mechanism and the timing mechanism used in the toaster illustrated in Figs. 1 and 3; Fig. 5 is a perspective view showing the position of the parts when the toast is removed for inspection or for removal; Fig. 6 is a perspective view of the mechanism in position for resetting the timing mechanism, and Fig. 7 shows the heating circuit of the toaster.

Referring to the drawing, I have shown my invention in one form as applied to a toaster which toasts both sides of a slice of bread at once. Accordingly heating elements 10 and 11 are vertically mounted within the casing 12 on either side of a slice holder 13. The slice holder 13 is L-shaped with low side walls. To prevent the slice of bread from coming into direct contact with the heating elements, a plurality of guard wires 14 and 15 are arranged to center the slice between the heating elements 10 and 11. It will be observed that the slice holder 13 moves outwardly at one end of the casing 12 as indicated by the dotted lines in Fig. 2. The slice holder 13 is carried by a U-shaped lever 16 rotatably mounted on a shaft 17 supported in the base of the toaster by means of the brackets 18 and 19. These brackets 18 and 19 also provide for the support of a second shaft 20 located below the shaft 17.

A single operating means as a handle 21, secured to the shaft 17 by the extensions 22 when turned from the position indicated in Fig. 5 in a clockwise direction, serves to move the slice holder 13 from the dotted line position of Fig. 2, to the toasting position between the heating elements 10 and 11 and by further clockwise movement energizes the heating elements and initiates the timing operation.

Reference should now be had to Figs. 4–6 inclusive for a detailed description of the mechanism which consolidates into the handle 21 the entire control of the toaster. One of the prongs of the lever 16, to which the slice holder 13 is secured, is slotted as indicated by the reference numeral 23 and extends below the shaft 17 to engage a pin 24 carried by a bracket 25 pivotally mounted on the shaft 20. To bias the slice holder 13 to its position between the heating elements 10 and 11, and to provide a snap action of the slice holder, a compression spring 26 is mounted on the slotted extension of lever 16 between shaft 17 and pin 24. To move the slice holder 13 to the dotted line position of Fig. 2, the handle 21 is moved in a counterclockwise direction to rotate the shaft 17 which has secured to it a rectangular member 27 which has a hook-shaped extension 28 engaging the pin 24. The compression spring 26 biases the slice holder 13 to its new position shown in Fig. 5.

If it is now desired to return the slice holder 13 to its toasting position between the heating elements 10 and 11, the handle 21 is rotated in a clockwise direction. The heel 29 of the hook-shaped extension 28 of the member 27, rotating with the shaft 17, strikes the pin 24, rotating the bracket in a counterclockwise direction and again by reason of the engagement of the pin 24 with the slotted extension 23 of lever 16, the slice holder 13 is returned from the position illustrated in Fig. 5 to the position shown in Fig. 4. It should now be observed that the continued movement of the handle 21 in a clockwise direction does not affect the position of the slice holder 13 by reason of the hook-shaped extension 28 which is free of engagement with the pin 24 for the continued movement of the handle. However, the continued movement of the handle 21 in a clockwise direction serves to energize the heating units and to initiate the timing mechanism by the cooperation of a member 30 secured to shaft 17 and an extension 31 of a bracket 32 rotatably mounted on shaft 17. It will be apparent that the engagement of the extension 31 by the member 30 turning with the shaft 17 rotates the bracket 32, to which is connected a link 33, the other end of link 33 engaging one end of a lever 34 which is connected to any suitable switching means and any suitable timing means for determining the toasting period.

It will be understood that any suitable switching means and timing means may be used and in the form of my invention shown, it will be observed that the lever 34 is pivoted at 36 and as it is moved by link 33 in a clockwise direction a snap action switch 35 is closed and energy is stored in a tension spring 37, which is secured to the lever 34 and a pin 38 mounted in the base of the toaster to later open the switch 35. The opening of the switch is determined by timing mechanism operatively connected by a link 39 to the lever 34. The other end of link 39 is secured by a slotted connection to a lever 40 pivoted at its center. Mounted on the timing spindle 41 is a driving gear 42 actuating through a gear train 43 an escapement mechanism 44. Arranged on the spindle 41 is a cam 45 formed with a sleeve and disc bearing which frictionally engages the spindle 41. The cam 45 is moved in a clockwise direction by the engagement of the base of a pawl 46 carried by a pin 47 secured to lever 40, the pawl being biased against the cam 45 by a spring 48 encircling the pin 47. It will be obvious from an inspection of Fig. 4 that this rotation of the cam 45 occurs when the timing operation is initiated by the rotation of the handle 21. When the handle 21 is in the position shown in Fig. 6 the free end of the pawl 46 hooks over a shoulder 49 provided in the cam 45 locking the timing mechanism to the switch operating lever 34. The tension spring 37 then urges the link 39 against the end of the lever 40 carrying the pawl 46 now engaging the shoulder 49 provided in the cam 45. As already indicated, however, the cam 45 frictionally engages the timing spindle 41. Therefore, it will be observed that the driving gear 42 is rotated at a speed dependent on the train of gears 43 and the escapement mechanism 44.

In order to disengage the pawl 46 from the cam 45 thus permitting the tension spring 37 to rotate lever 34 about its pivot point 36 to open the snap switch 35, there is provided a sector-cam 50 rotatably carried by a shaft 50a in the same axis as the spindle 41 but independent of same which cooperates with a depending pin 51 secured to the free end of the pawl 46. This pin 51 engages the outwardly curved surface 53 of the normally stationary adjustable sector-cam 50, and is thereby urged away from the cam 45 to gradually disengage the pawl 46 therefrom. To vary the point of disengagement and hence the period of time the switch 35 maintains the energization of heating elements 10 and 11, the cam 50 may be adjusted and to effectuate this adjustment I provide a dial 52 mounted on one end of a spindle 52a, the other end carrying a gear 54 which meshes with gear teeth formed in the sector-cam 50. By rotation of the dial 52 and the consequent rotation of the sector-cam 50 the point of disengagement of pawl 46 may be varied or in terms of ultimate result the time of toasting may be varied.

After the initiation of the timing operation by the rotation of the handle 21, as previously described, it will be remembered that the slice holder 13 may be moved at any time to its non-toasting position for the inspection of the toast. Provision is made for preventing further interference with the timing mechanism which might ordinarily occur by the accidental rotation of handle 21 beyond the central position or the position when the slice holder 13 is returned to the toasting position after an inspection of the toast by means of a simple automatically operating stop 55 for handle 21. The shaft 20 rotatably supports the stop 55 which is U-shaped and is provided with a relatively long extension 56 serving by its weight to bias the other shorter extension 57 into the path of the member 30. Before the initiation of the timing operation, the extension 31 of bracket 32 holds the stop extension 57 out of the path of member 30 as indicated in Figs. 4 and 5. However, after the bracket 32 has been moved to the position shown in Fig. 6, in setting the timing mechanism the extension 57 is free to move into the path of member 30 to thereby effectively prevent further operation of the timing mechanism until after it has operated to open the circuit. It should further be observed that handle 21 is automatically returned to its central position as shown in Fig. 4, whenever the handle 21 has been moved to the position shown in Fig. 6 by means of a spiral spring 58 secured to shaft 17 and the bracket 18. To facilitate the cleaning of the toaster a crumb tray 59 is slidably mounted beneath the heating elements 10 and 11, as shown in Figs. 1, 2 and 3. The heating circuit is diagrammatically illustrated in Fig. 7, the heating elements 10 and 11 being connected in series with each other and the energization controlling switch 35 across supply lines 60 and 61.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

What I claim as new and desire to secure by Letters Patent of the United States, is:

1. An electric toaster comprising stationary heating elements spaced apart one from the other, a slice holder, means mounting said holder for movement to and from a toasting position between said elements, timing mechanism operating to control said heating elements to reduce their rate of heat generation after a predetermined period, an operating handle, a driving connection between said handle and said slice holder for operating said slice holder to and from a toasting position between said elements upon movement of said handle between predetermined limits, said driving connection providing for continued movement of said handle beyond one of said limits independently of said slice holder, a driving connection between said handle and said timing mechanism effective to initiate operation of said timing mechanism upon movement of said handle independently of said slice holder, and means dependent upon the operation of said timing mechanism for preventing a subsequent movement of said handle beyond said one of said limits until after the expiration of said predetermined period but permitting the movement of said slice holder from said toasting position by said operating handle.

2. An electric toaster comprising a plurality of heating elements, a slice holder, means rotatably mounting said holder between said elements for movement to a toasting position with respect to said elements and to a non-toasting position with respect thereto, timing mechanism operable to control said elements to reduce their rate of heat generation after a predetermined period, a single operating handle, a driving connection between said handle and said holder for operating at any time said slice holder to and from its toasting and non-toasting positions during a predetermined movement of said handle, and a driving connection between said handle and said timing mechanism effective for the operation of said mechanism during a movement of said handle beyond said predetermined movement. After said slice-holder has been moved to its toasting position.

3. An electric toaster comprising a plurality of heating elements, timing means for automatically deenergizing said elements after a predetermined period, a slice holder, a single operating lever initiating operation of said timing means when rotated in one direction and when rotated in the other direction moving said slice holder from said elements, the said operating lever being at all times operable to move said slice holder from said heating elements and means rendering said single operating lever ineffective for subsequent operation of said timing means until after the expiration of said predetermined period.

4. An electric toaster comprising a plurality of heating elements, a slice holder, means for pivotally mounting said slice holder for rotation to and from a toasting position between said elements, switching means for controlling the energization of said heating elements, timing means controlling said switching means, a single operating handle, a driving connection between said handle and said holder, and a driving connection between said handle and said switching means and said timing means arranged so that the rotation of said handle from one position to a second position moves said holder from a non-toasting position to said toasting position between said elements and rotation of said handle beyond said second position to a third position operates said switching means so as to energize said elements, and initiates operation of said timing means.

5. An electric toaster comprising a plurality of heating resistances, a shaft, a slice holder rotatably mounted on said shaft for movement from an inspecting to a toasting position between said resistances, an operating connection between said shaft and said slice holder effective during a predetermined degree of rotation of said shaft in either direction to move said holder from one to the other of said positions but arranged to provide for continued rotation of said shaft after said slice holder has been moved to said toasting position, switching means for controlling said heating resistances, means responsive to said continued rotation of said shaft after said slice holder has been moved to said toasting position for operating said switching means to energize said heating resistances, timing means for controlling said switching means to deenergize said resistances after a predetermined interval, means responsive to said continued rotation of said shaft for initiating operation of said timing means, said shaft being free at all times for rotation through said predetermined degree for moving said slice holder from one to the other of said positions and a member actuated by said means initiating operation of said timing means for preventing further interference of said timing means after its operation has been initiated.

6. An electric toaster comprising a plurality of heating elements, timing means for controlling the time of energization of said elements, a slice holder pivotally mounted between said elements, a rotatable means operable from a given position in one direction of rotation to move said slice holder from a toasting position between said elements to an angular non-toasting position and operable in the other direction to said given position to move said slice holder from said angular non-toasting position to said toasting position and upon further rotation in the same direction beyond said given position to initiate operation of said timing means, and resilient means for returning said rotatable means to said given position when it is released after it has been rotated to initiate operation of said timing means.

7. An electric toaster comprising a plurality of heating elements, a slice holder, means rotatably mounting said holder for movement to and from a toasting position between said elements, timing means for controlling the energization of said heating elements, an operating handle, a driving connection between said handle and said holder effective at any time for the operation of said slice holder to and from a toasting position during rotation of said handle between predetermined limits, a driving connection between said handle and said timing means effective for the operation of said timing means upon the rotation of said handle beyond one of said limits, biasing means for returning said handle to said one limit, and stopping means associated with said driving connection for preventing the movement of said handle beyond said one limit after said timing means has been operated and said handle has been returned to said one limit but permitting movement between said predetermined limits.

8. An electric toaster comprising a heating chamber, a shaft, a slice holder rotatably mounted on said shaft for movement from an inspecting to a toasting position with reference to said heating chamber, a driving connection between said shaft and said slice holder effective during a predetermined degree of rotation of said shaft in either direction to move said slice holder from one to the other of said positions but arranged to provide for continued rotation of said shaft after said slice holder has been moved to said toasting position comprising a pin, means pivotally supporting said pin adjacent said shaft in a position substantially parallel with said shaft, a lever connected to said slice holder and with said pin so that said holder is operated between said inspecting and toasting positions by operation of said pin in opposite directions on said pivotal supporting means, resilient means interposed between said slice holder and said pin biasing said slice holder to one or the other of said inspection and toasting positions depending upon the relative positions of said slice holder and said pin, a hook-shaped member secured to said shaft and cooperating with said pin so that when said shaft is operated in one direction through said predetermined degree of rotation, said hook-shaped member engages said pin to operate said holder to its inspection position, and when said shaft is operated through said predetermined degree of rotation in the opposite direction said hook-shaped member engages said pin to move said holder to its toasting position and releases said pin when said holder reaches said toasting position to provide for continued movement of said shaft in said opposite direction.

9. An electric toaster comprising a plurality of heating elements, a slice holder, a shaft for supporting said holder, a pivoted member in juxtaposition with said shaft and operatively connected to said holder, driving means operable by rotation of said shaft into engagement with said member for moving said slice holder from a toasting to a non-toasting position and operable out of engagement with said member when said shaft is rotated beyond a predetermined limit, a switch for controlling the energization of said heating elements and an operating member secured to said shaft for closing said switch only when said shaft is rotated a predetermined distance beyond said limit, and timing means simultaneously operable by said operating member for opening said switch after the expiration of a predetermined time interval.

10. An electric toaster comprising a plurality of heating elements, a slice holder, a rotatable actuating shaft pivotally supporting said holder for movement to and from a toasting position between said elements, a switch for controlling the energization of said heating elements, means responsive to a predetermined degree only of rotation of said shaft in one direction for moving said holder from a non-toasting position to said toasting position, and means responsive to further rotation of said actuating shaft for closing said switch, to energize said heating elements, said latter means providing for subsequent movement of said holder by said shaft from said toasting position to said non-toasting position without disturbing the operation of said switch in its closed position to maintain the energization of said elements to hold a toasting temperature.

11. An electric toaster comprising a plurality of heating elements, a slice holder, a rotatable shaft pivotally supporting said holder for movement from a non-toasting position to a toasting position between said elements, a switch for controlling the energization of said heating elements, a timing device for controlling the operation of said switch, means responsive to a predetermined degree only of rotation of said shaft in one direction for moving said holder from said non-toasting position to said toasting position, and means responsive to further rotation of said shaft for operating said switching means to energize said elements, and to initiate operation of said timing device the said timing device serving to operate said switch to deenergize said elements after a predetermined period without disturbing the toasting position of said slice holder between said elements.

12. An electric toaster comprising a plurality of heating resistances, a shaft, a slice holder rotatably mounted on said shaft for movement from an inspecting to a toasting position between said resistances, a driving connection between said shaft and said slice holder effective during a predetermined degree of rotation of said shaft in either direction to move said slice holder from one to the other of said positions but arranged to provide for continued rotation of said shaft after said slice holder has been moved to said toasting position, switching means for controlling said heating resistances, means responsive to said continued rotation of said shaft after said slice holder has been moved to said toasting position for operating said switching means to energize said heating resistances, timing means for controlling said switching means to deenergize said resistances after a predetermined interval, means responsive to said continued rotation of said shaft for initiating operation of said timing means, the said shaft being free at all times for rotation through said predetermined degree for moving said slice holder from one to the other of said positions and means for preventing further interference with said timing means after the operation thereof has been initiated.

13. An electric toaster comprising a heating chamber, heating means within said chamber, a switch controlling the energization of said heating means, a timing device controlling the operation of said switch, a slice holder arranged for movement between a toasting position within said chamber and a non-toasting position out of said chamber, a single operating handle for said switch, said timing device and said slice holder, and operable connections between said members and said handle arranged so that said slice holder is moved to a toasting position in said heating chamber by movement of said handle to a predetermined position, and said switch is operated to effect the energization of said heating means and the operation of said timing device is initiated for a subsequent operation of said switch to effect the deenergization of said heating means by operation of said handle to another predetermined position, the operable connections between said handle and said switch being arranged so that said switch is operated to deenergize said heating means at the end of said predetermined interval of time without disturbing the toasting position of said slice holder within said heating chamber.

14. An electric toaster comprising a heating chamber, heating means within said chamber, a switch controlling the energization of said heating means, a timing device controlling the operation of said switch, a slice holder arranged for movement between a toasting position within said chamber and a non-toasting position out of said chamber, a single operating handle for said switch, said timing device and said slice holder, and operable connections between said members and said handle arranged so that said slice holder is moved to a toasting position in said heating chamber by movement of said handle to a predetermined position, and said switch is operated to effect the energization of said heating means and the operation of said timing device is initiated for a subsequent operation of said switch to effect the deenergization of said heating means by operation of said handle to another predetermined position, the operable connections between said handle and said switch being arranged so that said switch is operated to deenergize said heating means at the end of said predetermined interval of time without disturbing the toasting position of said slice holder within said heating chamber, and the operable connections between said handle and said slice holder providing for movement of said holder by said handle between its toasting and non-toasting positions at any time during the operation of said timing device independently of its operation and that of said switch.

15. An electric toaster comprising a heating chamber, heating means within said chamber, a switch controlling the energization of said heating means, a timing device controlling the operation of said switch, a slice holder, means pivotally mounting said slice holder for movement between a toasting position within said chamber and a non-toasting position out of said chamber, a single operating handle for said switch, said timing device and said slice-holder and operable connections between said members and said handle arranged so that when said handle is rotated in one direction to a predetermined position, said slice holder is moved from said non-toasting to said toasting position and when moved in said one direction beyond said predetermined position closes said switch to effect the energization of said heating element and initiates the operation of said timing device for a subsequent operation thereof at the end of a predetermined interval of time to operate said switch to effect the deenergization of said heating means, the operable connections between said handle and said switch and timing device being arranged so that said switch is operated to deenergize said elements at the end of said time interval without disturbing the position of said slice holder which remains in its toasting position in said heating chamber.

CHARLES P. RANDOLPH.